Jan. 6, 1948. J. R. BATES Re. 22,957

RESIDUAL HYDROCARBON TREATMENT

Original Filed April 5, 1941 2 Sheets-Sheet 1

INVENTOR
JOHN R. BATES
BY
Ira L. Nickerson
ATTORNEY

Jan. 6, 1948. J. R. BATES Re. 22,957

RESIDUAL HYDROCARBON TREATMENT

Original Filed April 5, 1941 2 Sheets-Sheet 2

INVENTOR
JOHN R. BATES
BY
Ira L. Nickerson
ATTORNEY

Reissued Jan. 6, 1948

Re. 22,957

UNITED STATES PATENT OFFICE 22,957

RESIDUAL HYDROCARBON TREATMENT

John R. Bates, Swarthmore, Pa., assignor to Houdry Process Corporation, Wilmington, Del., a corporation of Delaware Original No. 2,380,391, dated July 31, 1945, Serial No. 387,000, April 5, 1941. Application for reissue July 20, 1946, Serial No. 685,044

7 Claims. (Cl. 196—55)

Figure 1:
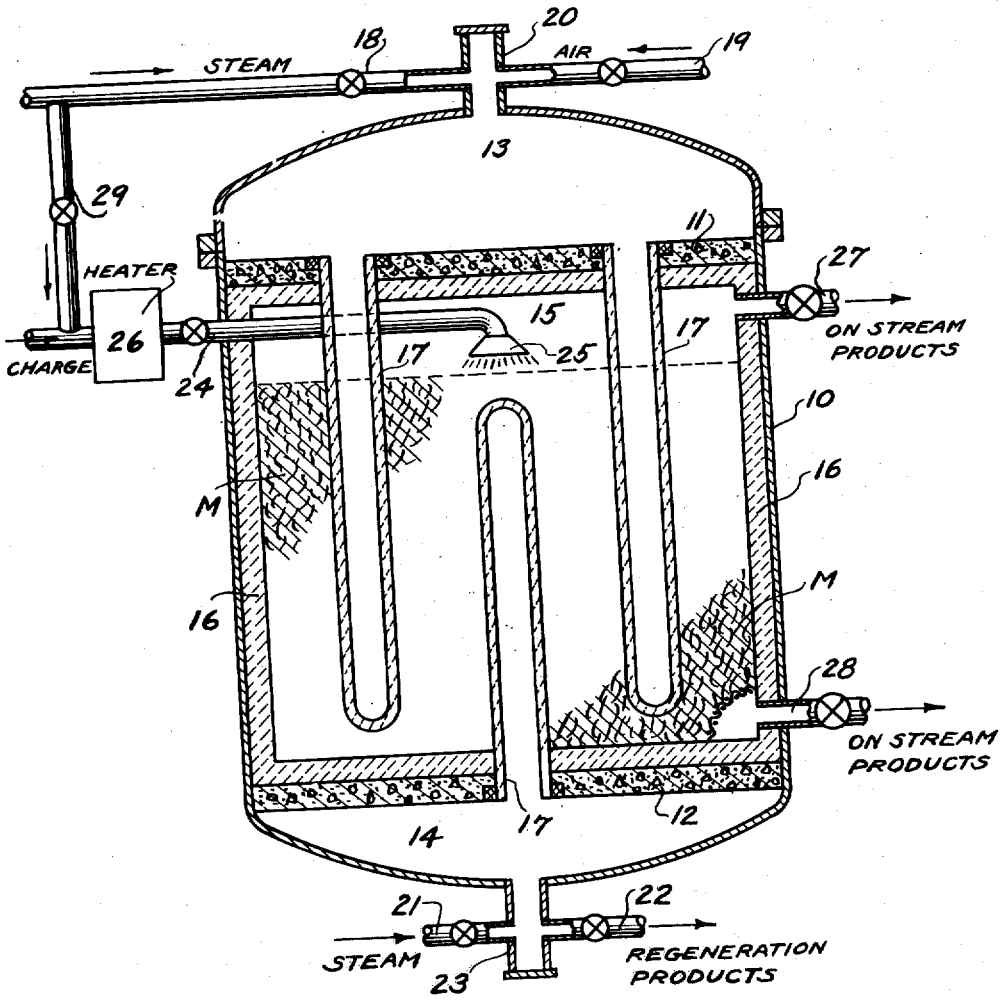

This invention relates to processes of and apparatus for effecting chemical reactions. It is especially adapted to the treatment or conversion of residues or residual materials such as those derived from petroleum, shale, oil, bituminous distillates, etc. In one particular use, the invention is concerned with the onstream treatment of a residual hydrocarbon material in a reaction chamber and under intense and controlled reaction conditions so as to remove therefrom all components such as ash, coke, tarry and resinous material, asphalt and other substances which would deleteriously affect the use of distillate products of the process and following the on-stream operation the invention is further concerned with the efficient removal from the reaction chamber of the deleterious components which have deposited therein.

One object of the invention is to provide an improved method and apparatus for preparing from heavy charging stocks, including bottoms or residues, a clean distillate material which may be sold commercially without further treatment or which may itself be used as a charging stock for further operations, as in the production of lower boiling hydrocarbons, etc. Another object is to provide method and apparatus for physically separating the deleterious components or coky material out of the residual charge and depositing the same in the reaction chamber. Another object is to remove the coky deposit from the reaction chamber without the use of mechanical equipment. Another object is to remove the coke deposit in a cycle of operating steps which provide for accurate control of the temperature of the reaction chamber. Another object is to provide apparatus especially adapted for high temperature operation. Other objects will become apparent from the detailed description which follows.

The invention involves treating a stock comprising or containing residual material by removing therefrom any components not in vapor phase and segregating the components in the form of a deposit within the chamber, thereby to provide clean volatile or distillate material which is directly usable or which may be subjected to any further conversion, transforming or other treating operation. In the case of hydrocarbons the stock is heated and while at least partly in vapor phase is fed to a coking or separating chamber having substantial heat storage capacity at a suitable rate and in such a manner as to permit expansion of the heated charge within the chamber, which chamber is maintained above 900° F.

in order to effect rapid vaporization of any liquid components entering with the charge. A diluent material, such as steam or other vaporizing fluid may and usually will be supplied to the chamber mixed with or independently of the charge to assist in the vaporization of the liquid portion of the charge and to assist in controlling the time of contact of the vapors in the reaction chamber, or in other words, to effect rapid removal of the vapors from the chamber in order to minimize cracking of the vapors into lower boiling material such as that in the gasoline boiling range. All or a part of the heat required for the separating treatment will be provided by the regeneration reaction or the period of the process following the on-stream reaction wherein the coke deposit is removed from the chamber by oxidation or burning of the deposit. The heat thus produced is absorbed by the chamber walls and other structure including any contact material which it may be desired to use in the reaction chamber to aid the process.

The oxidation of the deposit will be effected by admitting air or other oxygen-containing medium to the chamber after the endothermic on-stream reaction has lowered the temperature of the chamber to a predetermined point, as around 900° F., which is a temperature sufficiently high to begin the burning of the deposit. During the burning the temperature of the chamber will increase and be permitted to increase to a very high degree, for example, to a temperature of between 1200° F. and 2000° F. After the burning has continued for a period of time determined by the temperature to which it is desired to permit the chamber to rise the oxidizing medium will be cut off and a fluid such as steam will be supplied to the chamber where it will react at the high temperature with any coky deposit or carbon remaining therein and produce $H_2$, CO and $CO_2$ in proportions dependent on the temperature of the chamber and the amount of steam supplied. The reaction of steam with the carbon also removes some of the coky deposit and at the same time cools the chamber, and the cycle of oxidation of the deposit with a regenerating medium and cooling of the chamber with steam may be repeated as often as necessary until all or a desired portion of the coke is removed. After all or any desired amount of coke has been removed the chamber will be cooled down to at least 1300° F. but not below 1000° F. before beginning the on-stream period of the cycle and the on-stream operation carried out for a predetermined period of time or so long as the chamber remains at a temperature above 900° F. If the stored heat of the exothermic reaction is insufficient to maintain this temperature during an on-stream period the steam or other diluent medium entering the chamber will be superheated sufficiently to assure the supply of the necessary heat.

The percentage of inert fluid supplied to the coking chamber during the on-stream treatment of the charge will determine the overhead products resulting from the process. If it is desired to produce some gasoline but principally, as about 80–85 per cent of products in the light and heavy gas oil boiling range, the percentage of inert vaporizing fluid will be maintained relatively low in order to increase the contact time of the vapors in the coking chamber with a resulting increase in the amount of material in the gasoline boiling range. Conversely, the process may be operated to produce a minimum of gasoline by increasing the percentage of steam or other diluent supplied during the on-stream period which consequently reduces the time of contact of the vapors in the chamber to give a distillate product including heavy components of up to about 95 per cent of the charge, which product is suitable for use in a catalytic cracking operation without further treatment.

The coking chamber will be lined with a refractory or heat resistant material in order that high temperatures may be used. The chamber will be maintained above 900° F. by the evolved exothermic heat of the regeneration reaction and permissibly by heat added by the superheated steam or other vaporizing fluid. When a packing or contact material is used to assist the on-stream reaction more heat can be stored in the coking chamber and the refractory wall lining may be relatively thin while if no contact material is used the refractory lining should be of substantial thickness to maintain the temperature of the chamber above 900° F. and to give a sufficiently long on-stream reaction period to be commercially economical. Temperatures for the on-stream period are preferably in the range of 1000° F. to 1100° F. in order to provide for the rapid vaporization of the liquid material in the charge. The quantity of vaporizing medium supplied to the coking chamber will vary with the type of residual charging stock and for the most refractory stocks will be as high as 30 per cent by weight of the charge. The size of the coking chamber will be such as to permit the residual charge to expand therein and remain only sufficiently long to separate out the heavy components. Due to the high temperature of operation of the coking chamber the other conditions are adjusted so that the time of the vapors in the coking chamber will be less than 15 seconds and for most stocks less than 5 seconds.

Figure 2:
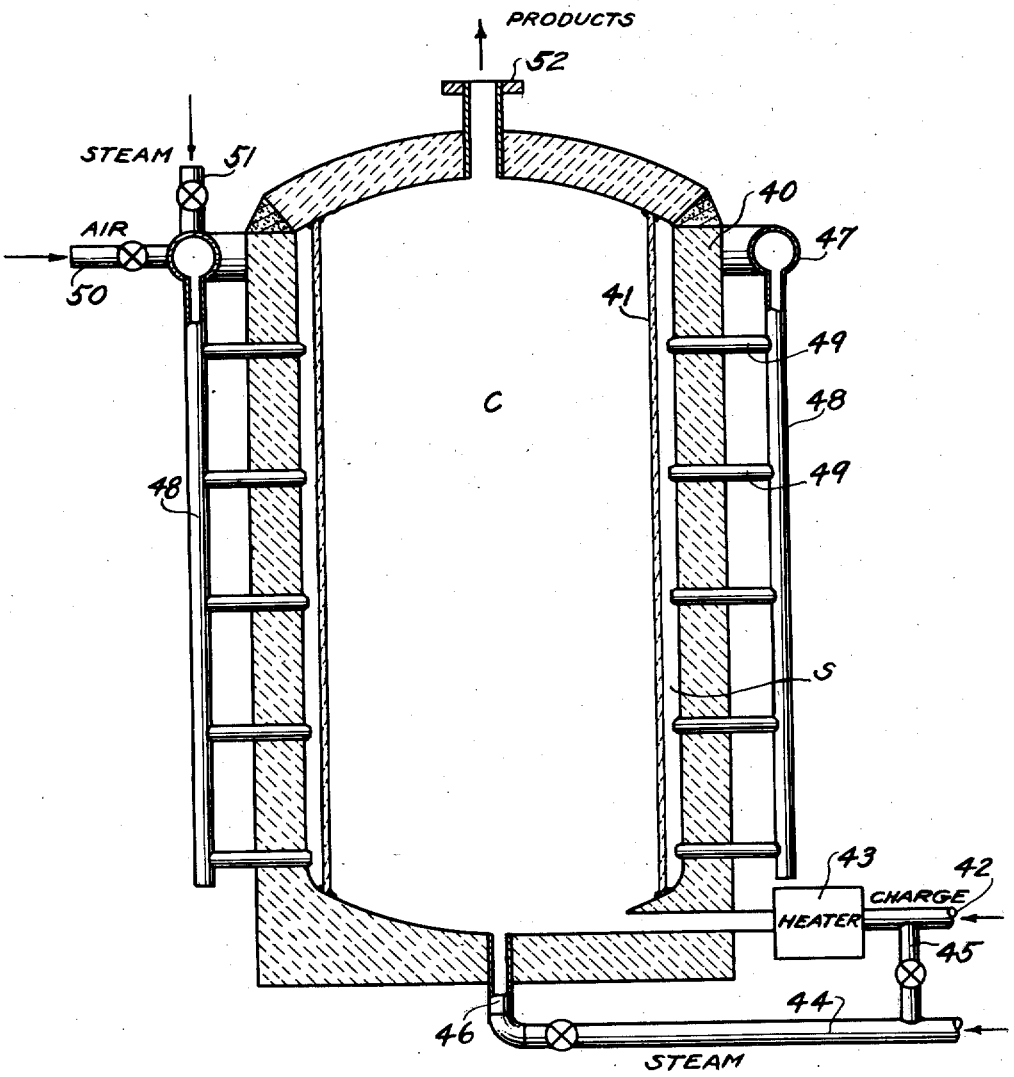

In order to illustrate the invention, reference may be had to the accompanying drawings, in which Fig. 1 is a vertical sectional view of one form of apparatus with certain parts appearing in elevation;

Fig. 2 is a similar view of another form of apparatus for carrying out the invention.

Referring to Fig. 1, 10 indicates generally a separator casing providing a coking chamber and having upper and lower partitions 11 and 12, respectively, extending thereacross forming with the upper and lower end walls of the separator a top manifold 13 and bottom manifold 14. The partitions 11 and 12 are preferably constructed of refractory material with the necessary metallic supporting materials embedded therein and form therebetween a reaction chamber generally indicated at 15, which has its top, bottom and side walls lined with ceramic or other heat resistant material, indicated generally at 16. The reaction chamber contains a body of relatively inert contact material M such as crushed quartz, fragments of brick, pieces of pumice, alumina, molded units of china clay or other silicates of alumina or clayey materials. The manifolds 13 and 14 are placed in communication with the reaction chamber 15 and the preferred means for accomplishing this purpose is the provision of foraminous tubes 17 which may be highly porous or in some instances have small perforations therein. The tubes 17 will be constructed of a heat resistant material such as alumina or manufactured Alundum, Borolon, Lionite or other ceramic material and are arranged to extend into the bed of contact material in a symmetrical manner in two sets or series, one of which communicates through the upper wall 11 with the upper manifold and the other set of which communicates through the lower wall 12 with the lower manifold 14.

The upper manifold 13 is placed in communication with a pair of valved conduits 18 and 19 through a interconnecting conduit 20 while the lower manifold 14 is likewise in communication with a pair of valved conduits 21 and 22 through an interconnecting conduit 23. Valved conduits 27 and 28 are placed in direct communication with the reaction chamber and the various conduits may be used in supplying fluid to or removing fluid from the reaction chamber. A valved conduit 24 extends through the side wall of the reaction chamber and is disposed above the body of contact material for supplying hydrocarbon charge through one or more nozzles 25. The conduit 24 is provided with a heater or heat exchanger 26 which is disposed exteriorly of the coking chamber and is used for heating the incoming charge to the desired temperature.

In operation the hydrocarbon charge is heated in the zone 26 to a temperature between 800 and 900° F. in a manner to prevent any cracking of the charge to material in the gasoline boiling range, and, in order to assist in the heating step, a conduit 29 is provided anterior of the heater and in communication with conduit 18, which is used for supplying steam or other vaporizing medium directly to the manifold 13. The amount of steam mixed with the charge before entering the heating zone is dependent upon the rate of heating and the particular charging stock used which will permit the heated charge to enter the zone predominately in vapor phase with the liquid components mixed therein. In order to effect a rapid vaporization of the liquid components in the charge, the coking zone will be maintained at a high temperature and will not be permitted to drop below 900° F. This temperature may be maintained at least in part by steam or other vaporizing fluid, which is admitted directly to manifold 13 through conduit 18, alone or along with steam or other vaporizing fluid which is supplied to manifold 14 through conduit 21. The steam or vaporizing fluid which is admitted to the coking zone, in addition to helping to maintain the zone at its proper temperature, also assists in vaporization of the liquid components of the charge and effects a rapid removal of the vapors from the coking zone through conduits 27 or 28. During the on-stream reaction a coky deposit will accumulate on the contact material M, the amount from a particular charge will depend on the length of the on-stream run and the amount of vaporizing fluid used during the operation. It is beneficial during the on-stream period to supply the vaporizing medium from each of the manifolds 13 and 14 so that all of the tubes are prevented from becoming clogged due to the coke depositing thereon which might prevent free flow of the regenerating medium when it is admitted after the on-stream period.

After the desired on-stream period the supply of charge through conduit 24 is stopped in order to regenerate the coking chamber and remove any desired amount of deposited coke. After the supply of heated charge is stopped steam or other inert gas is supplied to the coking chamber in order to purge the contact material of any liquid remaining therein and the valves in conduits 27 and 28 will remain open, during the purge period to remove purge products. At the beginning of the regeneration the coking zone 15, which has been maintained above 900° F., will be supplied with air from conduit 19 and the tubes 17 which are in communication with manifold 13, and the air will pass in parallel flow across the contact material to the set of tubes 17 which are in communication with manifold 14 and the products of regeneration removed through conduit 22. The air or other oxygen-containing medium effects an immediate oxidation or burning of the coke from the contact material due to the high temperature in the chamber, and the heat evolved while the burning continues increases the temperature of the contact material and refractory lining so that the coking zone may reach a temperature as high as 1800° or 2000° F., depending on the degree of burning. In order to cool the coking chamber, steam may be admitted thereto through conduit 18 alone, or if desired, along with the air and the temperature brought down to that desired to start the succeeding on-stream reaction. The steam, in addition to cooling down the coking zone, reacts with the carbon in the coking chamber and forms CO, $CO_2$ and $H_2$ and assists in removing the coke deposit. The removal of the coke deposit alternately by air and steam may be carried out any number of times desired in order to remove the proper amount of the coke deposit, which will permit a satisfactory on-stream reaction in the chamber. The on-stream reaction can be started when the coking chamber, after regeneration, has been cooled down to about 1300° and the on-stream reaction may continue until the heat used up during this reaction has reduced the temperature of the coking chamber down to about 900°. When the on-stream period is relatively short this reaction may be carried out solely by the heat stored in the coking chamber during the regeneration reaction.

In case the coke distribution in the packed case gives uneven heating on regeneration the temperature control of the chamber can be effected by a proper distribution of air and steam through valved conduits 27 and 28. For example, if a heavier carbon deposit is formed at the top of the mass than at the bottom, large amounts of steam can be admitted through conduit 27 to the top of the mass and less steam admitted through conduit 28 in order to control the temperature and maintain all portions of the mass at a substantially uniform temperature. In some types of regeneration it may be advantageous to supply air at one of the conduits 27 or 28 or both and remove the regeneration products through manifolds 13 and 14.

Fig. 2 is representative of a different or at least a modified form of apparatus which may be used to perform the process of the invention. It comprises a ceramic casing generally indicated at 40, having side and end walls of substantial thickness in order to retain sufficient heat in the chamber for an on-stream reaction. A foraminous enlarged tube 41, which preferably is constructed of alumina, forms a reaction chamber C and is positioned within the casing in a manner to provide a space S with the inner walls of the casing 40. The charge is admitted through conduit 42 having a heater 43 associated therewith and a steam manifold 44 is provided for conveying vaporizing fluid, such as steam to the conduit 42 through a valved connection 45 as well as directly to the reaction chamber C through a valved conduit 46. A header 47 is fixed outwardly of the casing and is provided with a plurality of branch lines 48 extending vertically of the chamber, each having a plurality of jets 49 extending through the side wall of the casing to be in communication with the space S formed by the foraminous tube 47 to distribute fluid evenly against the outer wall of the tube. Valved inlet connections 50 and 51 are in communication with the header 47 for respectively supplying air and steam to the header for passage into the space S.

In the operation of this coking chamber the charging stock is treated under conditions similar to those explained in the operation of the apparatus of Fig. 1 but will be admitted at the bottom of the chamber preferably tangentially thereto in order to effect a swirling action of the charge in the chamber and the chamber will be maintained above 900° F. and steam or vaporizing fluid will be admitted to the chamber in an amount necessary, dependent on the particular charge, to assist in the vaporization of the liquid portion of the charge and to limit the time of contact of the vapors in the chamber to less than 15 seconds. In this form of apparatus the coke tends to form on the walls of the chamber and the rate of the incoming charge and amount of vaporizing fluid are controlled so that the coke is deposited over substantially the entire inner wall of the tube 41 while preventing any entrained coke from being carried out through outlet 52. During the on-stream period, some steam should be admitted to the chamber C through jets 49 in order to prevent the tube 41 from becoming clogged by coke deposit and the operation may be continued, depending on the refractoriness of the charge until a predetermined coke deposit is formed on the walls of the tube 41 and then the on-stream charge will be cut off and the supply of steam continued to the manifold 47 for purging the coke of any retained liquids, the purge products being removed through the outlet 52, after which the coke may be removed by supplying air to the manifold 47 through valved connection 50 for passage to the air jets 49. The removal of coke may be effected by the alternate admission of steam and air through the jets 49, as explained in connection with Fig. 1.

The process heretofore outlined was carried out using 65 per cent bottoms from a heavy Southern California fuel oil as the charging stock which was heated to about 875° F. with sufficient steam to provide a mixture of vaporized material and unvaporized liquid material and to prevent any substantial cracking of the charge into low boiling hydrocarbons of the gasoline type. The heated mixture was then sent into the separating or expansion chamber at a pressure just sufficient to insure flow through the chamber and other equipment following the chamber and the chamber was maintained at an average temperature of about 1000° F. The vaporized portion of the charge was withdrawn rapidly from the chamber. By controlling the rate of feed of the charge to the chamber and regulating the percentage of steam or vaporizing fluid entering the chamber the vapors were removed therefrom in about 15 seconds. Recovered liquid boiling above the gasoline boiling range comprised about 83 per cent of the charge while the coke deposited in the chamber was very small, being slightly less than 5 per cent by weight of the original charge and the amount of gasoline formed was about 10 per cent of the charge. In another operation on the same charge and with all other conditions of operation the same excepting the percentage of steam used which was increased to reduce the contact time of the vapors in the chamber to about 5 seconds, the coke deposit remained about the same or about 5 per cent of the charge while the gasoline production was decreased to about 5 per cent and the liquid boiling above the gasoline boiling range increased about 5 per cent. Substantially the same results are obtained with either type of apparatus illustrated.

It is apparent from these typical operations that a high recovery of liquid product boiling above the gasoline boiling range can be obtained with the production of a very low percentage of coke. It is also apparent that the process can be operated to minimize gasoline formation by reducing the vapor time of contact in the chamber in order to remove the vapors from the chamber before they have time to crack to gasoline. The contact time is the resultant of the temperature, pressure and size of chamber, as well as the type of charging stock, rate of feed of the charging stock to the chamber, and the percentage of vaporizing fluid entering the chamber. The contact time of any particular operation can be arrived at from the volume of vapors leaving the chamber. The vapors leaving the chamber will be steam, non-condensible gases and oil. The volume of steam at the temperature and pressure conditions of the chamber can be calculated from any steam table. The non-condensible gases can be calculated from the method outlined for perfect gas laws. The volume of vaporized oil can be calculated, for example, from publication #97 of the Bureau of Standards entitled "Thermal Properties of Petroleum Products" in which are given calculated values determined for different petroleum fractions. The contact time given for the operations on the 65 per cent bottoms of Southern California fuel oil has been determined as above explained.

The general process steps of the invention may be carried out readily with either type of coking apparatus shown. However, with a charge containing a high percentage of liquid it will be found advantageous to use the packed chamber of Fig. 1 since the heat storage capacity will be greater than that of an unpacked chamber and the higher temperatures will of course effect a more rapid vaporization of the liquid. For treating charges containing a small percentage of liquid or for small scale operations the unpacked chamber of Fig. 2 will adequately serve to obtain optimum results. Any conventional or desired forms of baffling members may be provided over connections used as outlets for the reaction chamber (such as 27 in Fig. 1 or 52 in Fig. 2) to prevent entrainment of liquids or solids with outgoing vapors.

The invention is not to be limited by illustrations or examples but is intended to include all modifications within the scope of the appended claims.

I claim as my invention:

1. In a cyclic process involving alternate endothermic and exothermic reaction periods for treating a liquid or liquefiable heavy hydrocarbon charge to remove tarry and coky material therefrom and produce a clean distillate stock, the steps of heating the charge to a temperature above 800° F. to provide a mixture of vaporized material and unvaporized liquid material and under conditions to prevent any substantial cracking of the mixture into lower boiling hydrocarbons of the gasoline type, feeding the heated mixture during the endothermic period to a refractory separating zone having substantial heat storage capacity after an exothermic reaction has been conducted in the refractory zone to remove therefrom coky deposit and wherein during the exothermic reaction the temperature of the zone has gone above 1100° F. and sufficient heat has been stored in the zone to maintain the zone above 900° F. during the endothermic period of operation in order to effect within the zone rapid decomposition of the liquid material into vaporized material boiling above the gasoline boiling range and coke, controlling the feeding of the charge to the separating zone to effect removal of the vaporized material from the zone in less than 15 seconds in order to prevent any substantial amount of cracking to gasoline while retaining the coke in the zone, then cutting off the supply of the heated mixture to the zone during a succeeding exothermic period and removing coke from the zone by burning.

2. In a cyclic process involving alternate endothermic and exothermic reaction periods for treating a liquid or liquefiable heavy hydrocarbon charge to remove tarry and coky material therefrom and produce a clean distillate stock, the steps of heating the charge to a temperature above 800° F. to provide a mixture of vaporized material and unvaporized liquid material and under conditions to prevent any substantial cracking of the mixture into lower boiling hydrocarbons of the gasoline type, feeding the heated mixture during the endothermic period to a refractory separating zone having substantial heat storage capacity after an exothermic reaction had been conducted in the refractory zone to remove therefrom coky deposit and wherein during the exothermic reaction the temperature of the zone had gone above 1100° F. and sufficient heat had been stored in the zone to maintain the zone above 900° F. during the endothermic period of operation in order to effect within the zone rapid decomposition of the liquid material into vaporized material boiling above the gasoline boiling range and coke, controlling the feeding of the charge to the separating zone to effect removal of the vaporized material from the zone in less than 15 seconds in order to prevent any substantial amount of cracking to gasoline while retaining the coke in the zone, then cutting off the supply of the heated mixture to the zone during a succeeding exothermic period and removing coke from the zone by supplying an oxygen containing medium to effect burning of the coke until the zone rises in temperature above 1300° F., supplying steam to the zone to remove more coke and effect a cooling of the zone to the temperature desirable to begin the endothermic reaction.

3. In a cyclic process involving the successive subjection of relatively inert contact material to temperature elevation and to on-stream flow of a heavy hydrocarbon charge comprising liquid hydrocarbon material to produce a clean distillate stock free from tarry material and boiling above the gasoline boiling range, the steps of burning coke which was previously deposited on the inert contact material so that the temperature thereof will occupy a range which is effective as regards decomposition and vaporization of the heaviest portion of the charge, heating the charge and producing a mixture of vapor and liquid phase hydrocarbon material, contacting said mixture with a bed of such inert contact material having bed temperature at least as high as 1000° F. at the start of the on-stream period and approaching 900° F. during continuance of at least a substantial part of said on-stream period whereby said liquid portion of the charge is rapidly decomposed and vaporized substantially solely by transfer of heat thereto from the inert contact material which consequently drops in temperature as a deposit of coke accumulates thereon, and controlling the operation as regards the temperature of the inert contact material and restriction of the contact time of the hydrocarbon vapors therewith to about 15 seconds or less so as to prevent any substantial cracking of the charge into lower boiling hydrocarbons of the gasoline type.

4. In a cyclic process involving the successive subjection of relatively inert contact material to temperature elevation and to on-stream flow of a heavy hydrocarbon charge comprising liquid hydrocarbon material to produce a clean distillate stock free from tarry material and boiling above the gasoline boiling range, the steps of burning coke which was previously deposited on the inert contact material so that the temperature thereof will occupy a range which is effective as regards decomposition and vaporization of the heaviest portion of the charge, heating the charge and producing a mixture of vapor and liquid phase hydrocarbon material, contacting said mixture with a bed of such inert contact material having bed temperature less than 1000° F. and approaching 900° F. during continuance of at least a substantial part of the on-stream period whereby said liquid portion of the charge is rapidly decomposed and vaporized substantially solely by transfer of heat thereto from the inert contact material which consequently drops in temperature as a deposit of coke accumulates thereon, and controlling the operation as regards the temperature of the inert contact material and restriction of the contact time of the hydrocarbon vapors therewith to about 15 seconds or less so as to prevent any substantial cracking of the charge into lower boiling hydrocarbons of the gasoline type.

5. In a cyclic process involving the successive subjection of relatively inert contact material to temperature elevation and to on-stream flow of a heavy hydrocarbon charge comprising liquid hydrocarbon material to produce a clean distillate stock free from tarry material and boiling above the gasoline boiling range, the steps of burning coke which was previously deposited on the inert contact material so that the temperature thereof will occupy a range which is effective as regards decomposition and vaporization of the heaviest portion of the charge, heating the charge and producing a mixture of vapor and liquid phase hydrocarbon material, contacting said mixture with a bed of such inert contact material having bed temperature at least as high as 1200° F. at the start of the on-stream period and approaching 900° F. during continuance of at least a substantial part of said on-stream period whereby said liquid portion of the charge is rapidly decomposed and vaporized substantially solely by transfer of heat thereto from the inert contact material which consequently drops in temperature as a deposit of coke accumulates thereon, and controlling the operation as regards the temperature of the inert contact material and restriction of the contact time of the hydrocarbon vapors therewith to about 15 seconds or less so as to prevent any substantial cracking of the charge into lower boiling hydrocarbons of the gasoline type.

6. In a cyclic process involving the successive subjection of relatively inert contact material to temperature elevation and to on-stream flow of a heavy hydrocarbon charge comprising liquid hydrocarbon material to produce a clean distillate stock free from tarry material and boiling above the gasoline boiling range, the steps of burning coke which was previously deposited on the inert contact material so that the temperature thereof will occupy a range which is effective as regards decomposition and vaporization of the heaviest portion of the charge, heating the charge and producing a mixture which is predominantly in vapor phase with the liquid components mixed therein, directing said mixture together with a vaporizing medium into a vaporizing zone containing such inert contact material as elevated in temperature, contacting said mixture with a bed of such inert contact material having bed temperature less than 1000° F. and approaching 900° F. during continuance of at least a substantial part of the on-stream period whereby said liquid portion of the charge is rapidly decomposed and vaporized substantially solely by transfer of heat thereto from the inert contact material which consequently drops in temperature as a deposit of coke accumulates thereon, and controlling the operation as regards the temperature of the inert contact material and restriction of the contact time of the hydrocarbon vapors therewith to about 15 seconds or less so as to prevent any substantial cracking of the charge into lower boiling hydrocarbons of the gasoline type.

7. In a cyclic process involving the successive subjection of relatively inert contact material to temperature elevation and to on-stream flow of a heavy hydrocarbon charge comprising liquid hydrocarbon material to produce a clean distillate stock free from tarry material and boiling above the gasoline boiling range, the steps of causing the temperature of such inert material to be in a range between approximately 1300° F. and approximately 1000° F., heating the charge and producing a mixture of vapor and liquid phase hydrocarbon material, contacting said mixture with a bed of such inert contact material having bed temperature as aforesaid which, while decreasing over a substantial range, remains for substantially the entire duration of its contact with said hydrocarbon mixture at temperature above 900° F. to thereby rapidly decompose and vaporize the liquid portion of the charge substantially solely by transfer of heat thereto from the inert contact material which consequently drops in temperature as stated above as a deposit of coke accumulates thereon, and controlling the operation as regards the temperature of the inert contact material and restriction of the contact time of the hydrocarbon vapors therewith to about 15 seconds or less so as to prevent any substantial cracking of the charge into lower boiling hydrocarbons of the gasoline type.

JOHN R. BATES.

REFERENCES CITED

The following references are of record in the file of this patent:

UNITED STATES PATENTS

| Number | Name | Date |
|---|---|---|
| Re. 19,104 | Moore | Mar. 6, 1934 |
| 1,806,997 | Joseph | May 26, 1931 |
| 2,082,801 | Houdry | June 8, 1937 |
| 2,166,177 | Peterkin | July 18, 1939 |
| 2,270,360 | Voorhees | Jan. 20, 1942 |
| 2,271,096 | Ruthruff et al. | Jan. 27, 1942 |